United States Patent Office 2,927,866
Patented Mar. 8, 1960

2,927,866

BIS p,p(p.METHOXY, META-METHYL BENZOTRIAZOLYL) STILBENE O,O'-DISULFONIC ACID DISODIUM SALT

William Wilson Williams and Harlan Benjamin Freyermuth, Easton, Pa., assignors to General Aniline & Film Corporation, New York, N.Y., a corporation of Delaware No Drawing. Application November 15, 1954
Serial No. 469,044

2 Claims. (Cl. 117—33.5)

This invention relates to novel multicyclic-aromatic compounds containing a benzo(4,5)triazolyl-(2) grouping, and more specifically to sulfo- or carboxyl-containing X,X'-bis[benzo-(4,5)triazolyl(2)] multicyclic-aromatic-bridged compounds possessing new and useful properties which render them particularly useful as fluorescing optical bleaching or whitening agents.

It is well-known that textiles tend to develop a yellowish shade on aging which cannot be removed by ordinary bleaching or washing. The prior methods of "bluing" white materials with blue pigments or fugitive blue dyestuffs has largely been superseded in modern practice of laundering by addition of a fluorescent optical bleaching agent (brightener) with the soap or detergent in the washing bath. The brightening agent is conveniently supplied commercially in the form of an intimate admixture with detergent or soap in bars, flakes, powders, etc. The fluorescent optical bleaching agents by absorbing ultraviolet radiations and emitting light within the visible range, tend to neutralize any yellowness of the material and thus increase the apparent whiteness thereof.

As example of the types of compounds which have been suggested for use as fluorescent brightening agents may be mentioned (A) acylated derivatives of 4,4'-diamino stilbene-2,2'-disulfonic acid or diamino diphenyl sulfonic acids obtained by condensing two molar proportions of a benzoyl chloride with one molar proportion of the 4,4'-diamino stilbene-2,2'-disulfonic acid or diamino diphenyl sulfonic acid, a number of species of this type are disclosed, for example, in U.S. Patent 2,581,059 of Witte, British Patent 584,484 and Patent 2,643,198 of Savidge et al; (B) triazyl derivatives of diamino stibene disulfonic acid or diamino diphenyl sulfonic acid obtained by condensing 2 molar proportions of cyanuric chloride with 4,4'-diaminostilbene-2,2'-disulfonic acid (or diamino diphenyl sulfonic acid) and then condensing the thus obtained tetra chloro product with 4 molar proportions of the same or different primary amines, alcohols or phenols, a number of specific agents of this type being disclosed in application Serial No. 381,856, published May 11, 1943 by the Alien Property Custodian and U.S. Patent 2,618,636, Williams et al.; (C) the acylated derivatives of diamino dibenzothiophene dioxide, a number of specific compounds being disclosed in U.S. Patents 2,563,493 and 2,563,795 of Scalera et al.; and (D) the 4,4' - bis[5-sulfonaphtho(4,5)triazolyl(2)]aminostilbene-2,2'-disulfonic acids being disclosed in U.S. 2,668,777 of Gold et al.

It will be noted that these known fluorescent brightening agents are derivatives of aromatic diamines, the amino groups of which have been condensed with various benzyl chlorides, cyanuric chlorides, etc. as described in the above mentioned patents; or one of the amino groups has been so condensed and the other reacted with phosgene so as to produce a symmetrical bis ureido derivative.

We have now discovered that valuable novel fluorescent brightening agents may be obtained from the same type of aromatic diamines which have been used in known fluorescent agents; if instead of condensing the amino groups with such reactants as benzoyl chloride, cyanuric chloride, and the like, one (or both) of the amino groups is diazotized and a thus obtained diazo (or tetrazo) compound coupled with aromatic primary amine (which is devoid of chromophoric groups and which couples ortho to its primary amino group) and the thus obtained azo (or disazo) dye is then subjected to oxidation under suitable conditions, so that, a ring closure reaction occurs and triazole ring is formed of which the primary amino group of the coupler is one of the hetero atoms.

These novel fluorescent brightening agents, which we have discovered may be characterized as: condensed ring triazolyl derivatives containing a multicyclic aromatic bridging group and containing water-alkali solubilizing groupings. These novel compounds are extremely valuable fluorescing agents which fluoresce with a desirable shade and impart to textile fibers, particularly cellulosic fibers, an extremely desirable and subjectively pleasing bright whiteness. Also, we find that the novel compounds possess a substantially better fastness to bleaching (hypochlorite) in laundering than known bis[(substituted 2,4-diamino)-1,3,5-triazinyl(6)]4,4'-diaminostilbene-2,2'-disulfonic acids, aroylamides of 4,4'-diaminostilbene-2,2'-disulfonic acids or their salts. It is surprising that the benzotriazoles are substantive and can be used with soaps or detergents in laundering operations unlike the 5-sulfo naphthotriazoles.

Our novel compounds impart a less green cast to treated cellulosic fibers, which is subjectively more pleasing and of greater apparent whiteness than the aroylamides of 3,7-diaminodibenzothiophene-5,5-dioxide sulfonic acid salts, and then the 4,4'-bis[5-sulfonaphtho(4,5)-triazolyl-(2)]aminostilbene-2,2'-disulfonic acids, both of which impart to fabrics and to soap- or detergent-brightener compositions an esthetically undesirable green hue, the second prior art product having particularly poor substantivity so that it is practically of no value for whitening fabrics in laundering operations. In addition, our novel compounds have equal stability and in some cases improved fastness over known related compounds in regard to resistance to common agents such as soap, laundry bleach, etc., are substantially free from any tendency to decompose to colored products on aging or elevated temperatures as in ironing, are particularly strong in fluorescence, and are reasonably low in cost of production in proportion to their effectiveness. The absorption maximum of our products in the ultraviolet is closer to the visible wave lengths than most of the known brighteners and hence are particularly effective in absorbing the ultraviolet rays in the near visible region with corresponding high efficiency in emitting visible light waves. These compounds to an amazing degree combine the various desirable attributes of fluorescent brighteners. Fabrics washed with soaps or other detergents containing small amounts of the novel compounds, usually in the form of the sodium or other alkali metal salts become much brighter and whiter in the case of colors than fabrics which are washed with ordinary soaps or detergents and have a much more desirable appearance than fabrics washed with soaps or detergents in which previously known fluorescent agents are incorporated. These compounds may also be incorporated in synthetic fibers and films, especially those of cellulosic origin such as regenerated cellulose, cuprammonium cellulose, cellulose acetate and the like, by adding a small amount thereof to the spinning solutions or precipitating baths in order to effect a noticeable whiteness of the finished material.

Due to the ease of preparation and their desirable properties, the preferred compounds of the present invention are bis triazoles which may be represented by the following general formula:

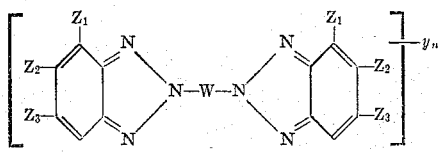

wherein W represents a divalent residue of a multicyclic, substantially planar, aromatic compound selected from the class of stilbene, fluorene, diphenyl, dibenzofuran, carbazole, dibenzothiophene-5,5-dioxide, naphthalene, dinaphthyl, acridine, pyrene and the lower alkyl, lower alkoxy or halogenated derivatives thereof; where $Z_1$, $Z_2$ and $Z_3$ represent hydrogen; lower alkyl, e.g. methyl, ethyl; lower alkoxy, e.g. methoxy, ethoxy; halo, e.g. chloro; acylamino, e.g. acetylamino, benzoylamino, lower alkylsulfonamido (methylsulfonamido), aryl-sulfonamido (benzenesulfonamido); N,N-di-(lower alkyl) amino, e.g. N,N-dimethylamino; where $y$ represents a water solubilizing group such as —$SO_3M$, —COOM, —$SO_2NH_2$, where M represents a metallic or ammonium cation; where $n$ represents a numeral whose value is less than 5.

The terms symmetrical and unsymmetrical are used herein to denote compounds in which the terminal portions of the molecule connected to the bridging component are identical or dissimilar, respectively, and in which at least one of the terminal portions is a [benzo-(4,5)triazolyl(2)]amino grouping.

While the preferred compounds of the present invention are bistriazoles of the formula given above, it has been found that compounds derived from aromatic diamines, of the type forming the central portion of prior art fluorescent brightening agents, in which one of the amino groups has been condensed with benzoyl chloride, cyanuric chloride, etc. and in which the other amino group has been diazotized, coupled with the primary aromatic amine which couples ortho to the amino group and the thus obtained monoazo dye oxidized so as to form a triazole compound, are also useful as fluorescent brightening agents and such mono triazole derivatives are therefore included within the scope of the present invention. Generically, therefore, the novel compounds of the present invention may be described as fluorescent brightening agents which are devoid of chromophoric groups and which contain at least one or

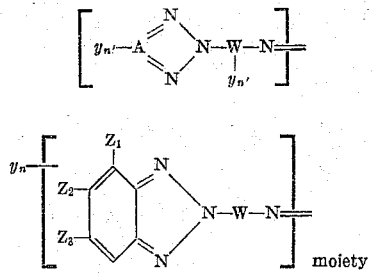
moiety wherein A is a benzo grouping (i.e. condensed benzene ring grouping) joined through adjacent carbons thereof to the nitrogenous portion of the triazole ring; where $n'$ represents 0, 1, 2 and 3; and wherein the values of W, $y$, $n$, $Z_1$, $Z_2$ and $Z_3$ represent the values denoted above and wherein the nitrogen valences may be satisfied (1) by being a part of an aro (condensed aromatic ring grouping e.g. benzo, naphtho) triazole group which may be either dissimilar from or identical to the benzo triazole group of the moiety; or (2) by being a part of an acylamido, ureido or a triazinyl derivative.

The symmetrical bis triazoles can be prepared by coupling one mole of the tetrazotized diamino bridge linking component with two moles of an ortho-amino-coupling aniline (e.g. an arylamine capable of coupling in the ortho position to the primary amino group of the aminobenzene) to form a bis azo (also called a disazo) compound and oxidation thereof to the symmetrical bis triazole.

The unsymmetrical bis triazoles can be prepared either (a) by coupling the tetrazotized diamino bridge linking component stepwise with two dissimilar ortho-amino-coupling aminobenzenes (anilines) and oxidation or (b) by diazotizing the amino nitro derivative of the multicyclic aromatic bridging component, coupling to an ortho-amino-coupling aniline, reducing, diazotizing and coupling with a second ortho-amino-coupling aniline or a second ortho-amino-coupling aniline or a second ortho-amino-coupling arylamine, followed by oxidation of the unsymmetrical bis azo compound to the unsymmetrical bis triazole.

As indicated above, the nitrogen valences may be a part of an acylamido, urea or a triazinyl grouping which may be prepared by reaction of the amino derivative of the moiety (from (b) in the preceding paragraph) respectively with an acylating agent, an isocyanate or cyanuric chloride (in the latter case, the dichloro product is further reacted with two moles of the same or different primary amines, alcohols or phenols to yield a trisubstituted triazino derivative of the aforementioned moiety).

Examples of diamino multicyclic substantially planar aromatic bridging compounds which are useful in our invention include 3,7-benzidine sulfone (3,7-diaminodibenzothiophene-5,5-dioxide), 4,4'-diamino-2,2'-stilbenedisulfonic acid, benzidine-3,3'-dicarboxylic acid, benzidine-3,3'-disulfonic acid, benzidine-2,7-diaminofluorene, 3,7-diaminodibenzofuran, 3,8-diaminopyrene, 2,7-diaminoacridine, 3,6- or 2,7-diaminocarbazole, m-tolidine, 4,4'-diamino-1,1'-dinaphthyl, 1,4-naphthalenediamine, 1,4-naphthalenediamine-2-sulfonic acid, dianisidine, mono-, di- or trisulfonated diaminodibenzothiophene-5,5-dioxide, dichlorodiaminodibenzothiophene-5,5-dioxide, diaminodimethyldibenzothiophene dioxide mono or disulfonic acid, dimethoxy benzidine sulfone and the like. We prefer stilbene disulfonic acids or salts as the bridging element type in view of the excellent fluorescent efficiency, chlorine stability, etc. of the corresponding bis-triazole derivatives.

While any non-chromophore-containing arylamines of the benzene series capable of coupling in a position ortho to the amino group may be used, we prefer aminobenzenes (e.g. anilines) containing less than 14 carbon atoms, i.e. whose substituents contain less than 8 carbon atoms in view of lesser costs and greater solubility due to the lower molecular weights. Examples of ortho amino couplers of the benzene series include 3-methoxy-p-toluidine, 3-ethoxy-p-toluidine, 3-dimethylamino-p-toluidine, m-phenylenediamine, 3-diethylamino-p-toluidine, m-(dimethylamino)aniline, m-(diethylamino)aniline, 4-amino-2-(diethylamino)benzenesulfonic acid, 4-amino-2-diethylaminobenzoic acid, 3-methanesulfonamido-p-toluidine, 3-benzenesulfonamido-p-toluidine, 3-acetamido-p-anisidine, 3-methanesulfonamido-p-anisidine, 3-dimethylamino-p-anisidine, 3-diethylamino-p-anisidine, and the like.

In preparing the azo dye intermediates of the desired triazoles, the ortho-amino coupling aniline in dilute aqueous solution or suspension is treated with a solution of a tetrazotized diamine bridging component. The pH of the coupling reaction media is varied according to the coupling component used in the individual reaction, for example, the phenylenediamines were found to couple well in acid solution (pH 2–5); the anilines containing a solubilizing group such as sulfonic acid, sulfonamido, or a carboxylic acid group were found to couple well in alkaline solutions (pH 8–11); in the presence of alkali metal hydroxides or carbonates; or coupled in the presence of a coupling promoter such as a tertiary amine or tertiary N-heterocyclic compound such as pyridine in slightly acidic solutions (pH 4–6).

While the acylamino aryl azo intermediates may be prepared directly from the corresponding acylamino anilines by reaction with a tetrazotized bridge-linking diamine, it is also possible to prepare acylamino azo intermediates by acylation of the product of coupling of the phenylenediamine coupler with the tetrazotized diamino bridge linking component. Suitable acylating agents include acetyl chloride, acetic anhydride, benzoyl chloride, benzene sulfonyl chloride, methane sulfonyl chloride, 2,4-dimethoxybenzoyl chloride, and the like.

The bis azo dye intermediates useful in this invention contain in each of the coupling component portions of the molecule a primary amino group which becomes a hetero atom of a triazole ring when the ortho, ortho' diamino bis azo dye is oxidized under suitable conditions. The crude bis azo reaction product from the coupling reaction is preferably recovered by filtration and the wet filter cake is slurried in water, a mild oxidizing agent added and the mixture heated with stirring until most of the color (of the azo dye) disappears. The fluorescent brightener is recovered by filtration. The procedure is varied somewhat based on the choice of the oxidizing agent. For example when one uses ammonical cupric sulfate as the oxidizing agent the resultant by-products of the reagent may be removed by adjustment of the pH of the solution, i.e. the reduction products of the oxidizing agents may be solubilized by making the solution more acidic so that the by-products are removed by filtration (e.g., present in the filtrate). Alternatively the by-products may be removed in the filtrate by making the reaction media alkaline with ammonia (pH 11) prior to filtration. While we prefer to use metallic (ic→ous) oxidizing agents, one may use hydrogen peroxide, ferric ammonia sulfate, ferric chloride, nitrobenzene and copper powder, potassium permanganate, potassium dichromate, calcium hypochlorite, sodium hypochlorite, sodium perborate, oxygen, etc. Passage of air through a hot solution or slurry of the ortho, ortho' diamino bis azo dye leads to the triazole ring formation very slowly and perhaps incompletely.

The bistriazole in the form of a salt is recovered in the form of a paste on filtration of the oxidation mixture and may be used in this form or dried to a powder. If desired, the bistriazole may be purified by crystallization from a solvent, e.g. acetic acid, formamide and the like.

The acid form (sulfonic acid, carboxylic acid, sulfonamide) of the bis triazole may be obtained by treatment of a salt thereof, e.g. the sodium salt, with a strong acid, e.g. mineral acids or strong organic acids.

The aqueous-alkali solubilized bis triazole may be converted to various metal or ammonium salts by treatment of the acid form with a metal (preferably alkali or alkali earth) hydroxide or carbonate, or with ammonia or a basic amine (e.g. pyridine, trimethylamine, triethanolamine).

An outstanding feature of the subject bistriazole "clorox" stable brighteners is their desirable shade of fluorescence. The subject brightening agents having a blue shade of fluorescence, are more valuable to the trade because they impart to the carrier a more white appearance in daylight, i.e. without a pronounced green, or pink tint characteristic of many "brighteners." In particular, the bis benzo triazole derivatives of stilbene disulfonic acid have excellent substantivity for cotton and viscose rayon and impart a very desirable bluish white shade to these fibers unlike the objectionable greenish shade of many prior art brighteners such as the aroylamino derivatives of dibenzothiophenedioxide and 4,4'-bis-[5-sulfonaphtho(4,5)triazolyl(2)]aminostilbene - 2,2' - disulfonic acids.

While the subject brighteners (or whitening agents) are particularly adapted to whitening of textiles, they have general utility in the whitening of "white" (yellowish white) organic materials. When the subject whitening agents are incorporated into paper or other wrapping material, an improvement in the whiteness as well as added protection of the contents from the action of ultraviolet light results. The white background of photographic prints and diazotype prints can be improved by incorporating small amounts of the bistriazole into the coating formulations. By addition of the subject benzo triazoles to discharge pastes, the whites obtained upon discharge are decidedly whiter than those discharges made in the absence of said materials. If small quantities of the subject benzo triazoles are added to soaps or other detergents, fibers which are washed using these formulations will be much whiter in the case of whites and much brighter in the case of colors than fabrics which are washed with ordinary soaps or detergents. These materials may be used to bleach fabrics. In such cases, the amount of bleach necessary is materially reduced and one or more steps in the bleaching operation may be eliminated.

In the case of certain of the less water soluble brighteners of this invention, the product is dissolved in an alcohol, ketone or amide water-soluble solvent such as ethanol, isopropanol, acetone, dimethyl formamide and the like and applied as such to the fiber or used in the form of aqueous emulsions prepared therefrom.

The following examples in which parts are by weight, unless otherwise indicated, are illustrative of the instant invention and are not to be regarded as limitative.

*Example 1*

18.5 parts of 4,4'-diamino-2,2'-stilbenedisulfonic acid, 200 parts water and 10.4 parts 40% aqueous NaOH are heated to 60–65° C. (pH 10.4) for ten minutes to dissolve the salt of the diazo precursor. The mixture is then cooled to 5–10° C. and tetrazotized with a 30% aqueous solution containing 7.05 parts sodium nitrite. The mixture was added at 5–9° C. to 100 parts water-ice mixture containing 37 parts concentrated hydrochloric acid. After the tetrazotization is complete any excess nitrous acid is destroyed by the addition of a small amount of a 10% sulfamic acid solution. To the tetrazotized solution was added to a mixture of 29 parts 3-methoxy-p-toluidine, 870 parts of water and 23 parts conc. hydrochloric acid at 8° C. The pH was raised to 4.6 by addition of 90 parts sodium acetate anhydrous, stirred 15 minutes at 8–10° C. when a precipitate separated. To the mixture, 300 parts pyridine was added (pH rose to 5.9) and temperature raised to 18° C. After 15 minutes, coupling was completed (pH 6.15). The mixture was then stirred overnight and bisazo dye was separated by filtration. The wet cake of the bisazo dye was slurried with 300 parts of water, made alkaline with concentrated aqueous ammonia and a solution of 26.9 parts cupric sulfate (CuSO$_4$.5H$_2$O) and 80 parts water were added. To the mixture was added 45 parts of concentrated ammonia and the reddish slurry heated to 90° until the color of the slurry changes to a greenish yellow (44 hours). By this procedure, the bisazo dye was oxidized to the corresponding bistriazole by the cupric sulfate. To the mixture, 85 parts of 20% hydrochloride was added (pH 2). The hot solution was filtered, and 50 parts of common salt added to the filtrate. The precipitate was then recovered by filtration, washed with ammoniacal salt solution.

The product which is useful as a fluorescent agent has the following structure:

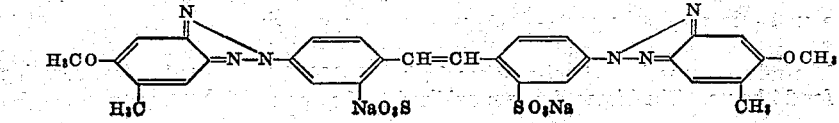

The product may be purified, if desired, by heating it first with dilute sulfuric acid and then with an excess of ammonia at about 90° C. Salt is added and the precipitate at room temperature is recovered by filtration.

5 parts of Indian Head cotton fabric was treated with 100 parts of a water solution containing 0.00032 part of the bistriazole and 0.4 part soap for 20 minutes at 130° F. in a Launderometer. The cotton swatch was rinsed and dried. The brightness was measured in an adapted fluorescent photometer and was found to give a brightness reading of 85.3 which value is substantially higher than results obtained with commercially acceptable

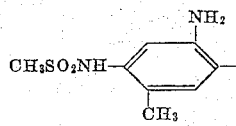

brighteners. Also, the rate of exhaustion on application to cotton of the subject compound is very rapid so that the subject product is used more completely in dyeing operations. The "clorox" stability was excellent. The

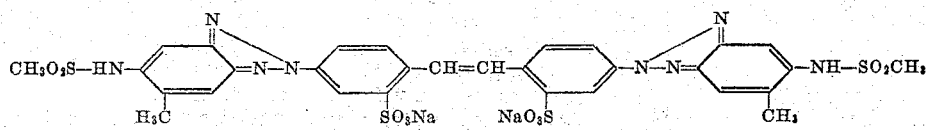

product has exceptional lightfastness when compared with commercial brighteners.

100 parts of a water solution containing 0.00016 part bistriazole and 25 parts "clorox" solution (15 parts "clorox" per 1000 parts water) and 0.4 part soap were heated to 130° F. After 20 minutes sufficient reducing agent was added to destroy the "clorox" and 5 parts Indian Head cotton fabric was added and placed in the Launderometer for 20 minutes at 130° F. The cotton swatch, after rinsing and drying, gave a brightness reading increase of 17% over a control (not clorox treated) according to measurements in the adapted fluorescent photometer.

Example II 31.6 parts of benzidinesulfone monosulfonic acid was dissolved in 400 parts water by addition of sodium ash. To this solution was added an aqueous solution containing 13.8 parts of sodium nitrite. The mixture was poured into 500 parts ice containing 60 parts concentrated hydrochloric acid and stirred for 1 hour at 10–15° C. The tetrazotized product was added to 30 parts of 3-methoxy-p-toluidine in one liter of 6% hydrochloric acid at 0° C. The pH of the mixture was raised to pH 4 by the addition of sodium acetate, allowed to stir overnight during which time room temperature was reached. The bis azo dye recovered by filtration was diluted to a volume of 2 liters; 80.5 parts of 28% ammonia and a solution of 80 parts cupric sulfate and 60 parts water were added. The mixture was heated on a steam bath (90–95° C.) for 24 hours. The bisazo dye was oxidized to the corresponding bistriazole during this heating period and the color of the bisazo dye disappeared. After cooling, the bistriazole was separated as in Example I and dried in a vacuum oven and ground in a hammer mill. The fluorescent agent obtained by this method has the following structure:

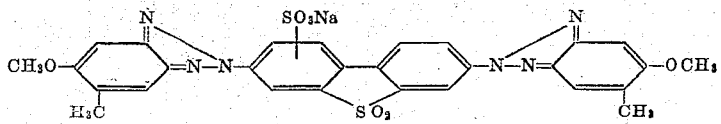

When an 0.08% aqueous solution of the product containing soap is applied to cotton as in Example I, a whiter appearance of the fabric is produced.

Example III 79.2 parts of the bis azo dyestuff of the formula:

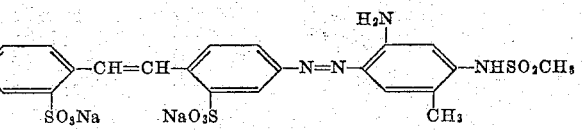

made by coupling tetrazotized, 4,4'-diamino-2,2'-stilbene-disulfonic acid to 5-amino-1-methanesulfono-o-toluide followed by oxidation to the bistriazole with cupric sulfate as in Example II to give the product of the formula:

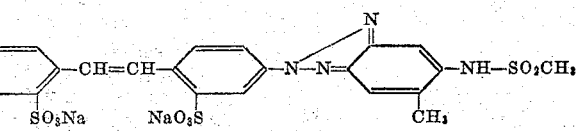

The product, when applied to cotton as in Example I, imparts an excellent fluorescent whiteness to the fabric of excellent clorox stability.

Example IV 62 parts of the bis azo dyestuff of the formula:

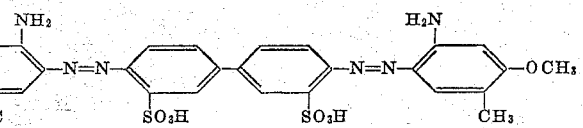

made by coupling tetrazotized 4,4'-diaminodiphenyl-3,3'-disulfonic acid with 3-methoxy-p-toluidine followed by oxidation with cupric sulfate as in Example II to give the corresponding bis triazole of the following formula:

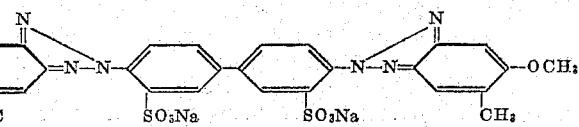

The product, when applied to cotton as in Example I, imparts an excellent whiteness to the fabric of excellent clorox stability.

Example V 55 parts of the bis azo dyestuff of the formula:

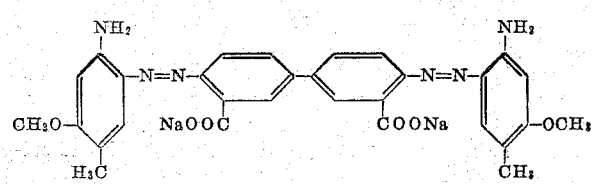

made by coupling tetrazotized benzidine-3,3'-dicarboxylic acid with β-methoxy-p-toluidine followed by oxidation with cupric sulfate as in Example I to give the corresponding bis triazole:

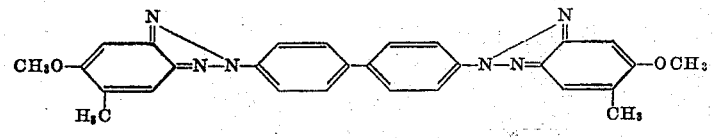

When the product is applied to cotton fabric as in Example I, a greenish fluorescent appearance results.

*Example VI*

57.4 parts of the bis azo dyestuff of the formula:

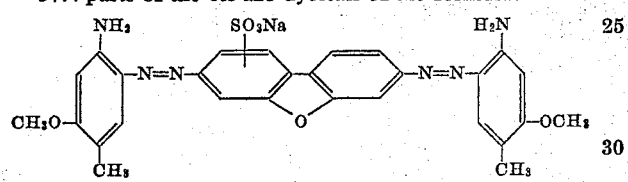

made by coupling tetrazotized 3,7-diaminobenzofuran monosulfonic acid with 3-methoxy-p-toluidine, followed by oxidation to the corresponding bistriazole with cupric sulfate as in Example II to give the product of the following

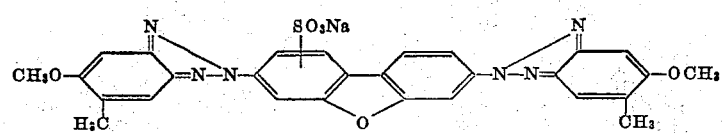

When the product is applied to cotton fabric as in Example I, a whiter appearance of the cloth is produced.

*Example VII*

67 parts of this bis azo dyestuff of the formula:

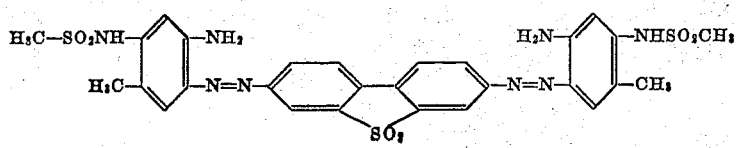

prepared by coupling tetrazotized benzidine sulfone with 3-methane sulfonamido-p-toluidine (5-amino-1-methane-sulfono-o-toluide) followed by oxidation with ammoniacal cupric sulfate as in Example II to yield a product of the following formula:

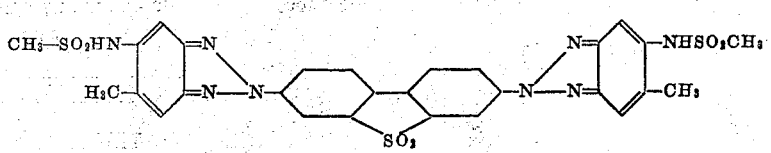

When the product is applied to cotton fabric as in Example I, a whiter appearance of the cloth is produced.

*Example VIII*

75 parts of the bis azo dyestuff of the formula:

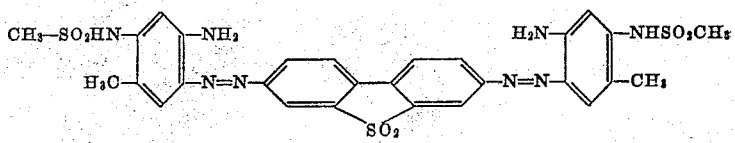

prepared by coupling tetrazotized benzidine sulfone-monosulfonic acid with 5-amino-1-methanesulfono-o-toluide followed by oxidation with cupric sulfate as in Example II to yield the corresponding bistriazole of the following formula:

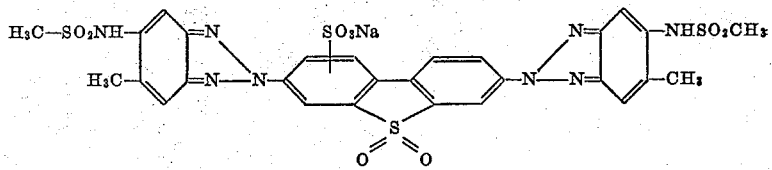

When the product is applied to cotton as in Example I, and excellent, whiter appearance results.

This application is a continuation-in-part of our application Serial No. 396,726, filed on Dec. 7, 1953, now Patent No. 2,733,165.

Various other modifications and variations of this invention will be obvious to a person skilled in the art and it is to be understood that such modifications and variations are to be included within the purview of this application and the spirit and scope of the appended claims.

We claim:
1. The compound of formula:

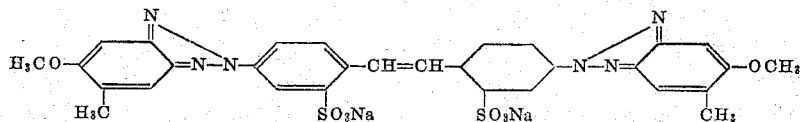

2. White organic materials having incorporated therein an effective amount of a whitening agent as defined in claim 1.

References Cited in the file of this patent
UNITED STATES PATENTS

| | | |
|---|---|---|
| 2,666,062 | Brunner | Jan. 12, 1954 |
| 2,668,777 | Gold et al. | Feb. 9, 1954 |

FOREIGN PATENTS

| | | |
|---|---|---|
| 508,605 | Belgium | July 22, 1952 |

OTHER REFERENCES

Krepelka et al.: Chem. Abstracts, vol. 45, col. 6845 (1951).